United States Patent
Callesen et al.

(10) Patent No.: US 12,460,719 B2
(45) Date of Patent: Nov. 4, 2025

(54) METHOD FOR SHIFTING AN ELECTRICALLY SHIFTABLE TRANSMISSION FOR A VEHICLE, IN PARTICULAR A COMMERCIAL VEHICLE

(71) Applicant: ZF CV Systems Global GmbH, Bern (CH)

(72) Inventors: Matthias Callesen, Wennigsen (DE); Uwe Winkelholz, Wennigsen (DE)

(73) Assignee: ZF CV Systems Global GmbH, Bern (CH)

( * ) Notice: Subject to any disclaimer, the term of this patent is extended or adjusted under 35 U.S.C. 154(b) by 24 days.

(21) Appl. No.: 18/406,560

(22) Filed: Jan. 8, 2024

(65) Prior Publication Data

US 2024/0229927 A1    Jul. 11, 2024

(30) Foreign Application Priority Data

Jan. 11, 2023    (EP) .................................... 23151215

(51) Int. Cl.
  *F16H 61/04*    (2006.01)
  *F16H 59/68*    (2006.01)
  *F16H 61/32*    (2006.01)
  *F16H 61/28*    (2006.01)

(52) U.S. Cl.
  CPC ......... *F16H 61/0403* (2013.01); *F16H 59/68* (2013.01); *F16H 61/32* (2013.01); *F16H 2061/047* (2013.01); *F16H 2061/2823* (2013.01)

(58) Field of Classification Search
  CPC ...... F16H 59/68; F16H 61/0403; F16H 61/32; F16H 2061/047; F16H 2061/2823
  See application file for complete search history.

(56) References Cited

U.S. PATENT DOCUMENTS

| | | | | |
|---|---|---|---|---|
| 2005/0234625 | A1* | 10/2005 | Shimojo | F16H 61/2807 |
| | | | | 701/51 |
| 2008/0099266 | A1* | 5/2008 | Hiroi | F16H 61/32 |
| | | | | 180/219 |
| 2010/0056336 | A1* | 3/2010 | Zdych | F16D 48/06 |
| | | | | 477/179 |

FOREIGN PATENT DOCUMENTS

| | | |
|---|---|---|
| DE | 19713423 A1 | 11/1997 |
| DE | 69402779 T2 | 11/1997 |
| DE | 10226152 A1 | 12/2003 |
| DE | 102008000642 A1 | 9/2009 |
| DE | 102015210698 A1 | 12/2016 |
| DE | 102015224101 A1 | 6/2017 |
| DE | 102019204294 A1 | 10/2020 |

\* cited by examiner

*Primary Examiner* — Edwin A Young
(74) *Attorney, Agent, or Firm* — Dickinson Wright PLLC

(57) ABSTRACT

A method (100) for shifting an electrically shiftable transmission (230) for a vehicle (200a), such as a commercial vehicle, is provided. The method (100) includes ascertaining (110) a constraint (310) relating to a shifting element (235) of the transmission (230) and determining (120) a motion profile (300) for the shifting element (235). The motion profile (300) defines a position (P) of the shifting element (235) as a function of time (t). The method further includes outputting (130) a regulation signal (255) for regulating the position of the shifting element (235) on the basis of the motion profile (300).

20 Claims, 2 Drawing Sheets

METHOD FOR SHIFTING AN ELECTRICALLY SHIFTABLE TRANSMISSION FOR A VEHICLE, IN PARTICULAR A COMMERCIAL VEHICLE

FIELD

The present disclosure relates to a method for shifting an electrically shiftable transmission for a vehicle, in particular a commercial vehicle. The present disclosure also relates to a computer program and/or computer-readable medium, a control device for a vehicle, in particular a commercial vehicle, with an electrically shiftable transmission, and an electrically shiftable transmission with a shifting element and a vehicle, in particular a commercial vehicle.

BACKGROUND

Electrically shiftable transmissions are known from the prior art. A target position of an electric shifting actuator is adjusted in a manner similar to the target position of a pneumatic shifting actuator. The target position is specified, and the shifting actuator adjusts a shifting element of the transmission in accordance with the required target position through the use of a force. In so doing, the shifting element may cause an impact when it reaches the target position, or the motion initiated may under some circumstances be jammed in a tooth-to-tooth position. Both situations may cause noise and/or impairment of the function of the transmission.

DE 197 13 423 C5 discloses an apparatus for the automated actuation of a transmission which is shiftable between a plurality of gears, with a torque transmitting system which is actuatable in an automated manner at least during a gear change, with at least one actuating element which is drivable by at least one drive unit and at least one actuatable shifting element which is arranged on the transmission. In this apparatus, a drive connection is provided between the at least one shifting element arranged on the transmission and the at least one drive unit, and an additional presettable elastic means or an additional element with a presettable elastic means is functionally arranged substantially in the path of force of this drive connection between the drive unit and the at least one shifting element.

DE 694 02 779 T2 discloses a method for controlling a force exerted on a shifting mechanism of an automatic mechanical transmission during a shifting operation, wherein the transmission has at least one shift rod, the shifting mechanism contains a shift finger driven by a motor, the shift finger cooperates with the shift rod to shift the transmission, wherein the method includes exciting a motor with a pulse-width-modulated control signal with a variable duty cycle to generate a target current applied to the motor, and wherein the current drawn by the motor is detected, wherein the duty cycle of the control signal is continuously adjusted during a shifting operation as a function of the sum of the error between the current detected and the target current plus the rate of change of the error, to reduce the error toward zero.

The present disclosure is therefore based on the object of enhancing the prior art and providing an improved method for shifting an electrically shiftable transmission.

SUMMARY

In particular, the invention is able to achieve the object of improving the motion of a shifting element in order to improve the functionality of the manual transmission and/or reduce the emission of noise.

The object is achieved by a method according to the present disclosure and the various corresponding developments described herein.

According to the present disclosure, a method for shifting an electrically shiftable transmission for a vehicle, in particular a commercial vehicle, is provided. The method comprises: ascertaining a constraint relating to a shifting element of the transmission; determining a motion profile for the shifting element, wherein the motion profile defines a position of the shifting element as a function of time; and outputting a regulation signal for regulating the position of the shifting element on the basis of the motion profile.

It has been found that, compared to a pneumatic shifting actuator, the electrically shiftable transmission has more possibilities for controlling and/or regulating the electric shifting actuator, and thus for moving the shifting element. For example, a jerk-free motion profile can be applied to the shifting element in order to define the desired position or position of the shifting element as a function of time. The motion profile establishes the desired position of the shifting element as a function of time. The constraint may define the motion of the shifting element by specifying a position, velocity, acceleration and/or a further derivative of position as a function of time, which defines the motion profile. The constraints define a motion segment of the shifting element of the transmission. In other words, the path between the constraint points is therefore determined with the aid of the constraints to be specified, such as the location, velocity or acceleration of the constraint points of the motion segment. The motion profile as a whole is made up of a succession of motion segments in accordance with the motion task in question. The profile may therefore be defined on the basis of the constraint, wherein the constraint determines or limits the motion of the shifting element, depending on the application. The constraints to be specified of the motion segments may be changed in an advantageous manner so as to positively influence the properties of the shifting operation, such as impact velocity and overshoot, and to take into account any applicable limits in the motion sequence from the outset.

Moving the shifting element in accordance with the motion profile makes it possible for example to avoid the impact of the shifting element at an uncontrolled and/or undefined velocity in an end position. It is thus possible to reduce noise and improve shifting performance. Furthermore, electric shifting avoids the discharge noise produced in pneumatically shiftable transmissions. Costs can be reduced by designing intermeshing shifting elements in a targeted manner with regard to the electric shifting procedure described. The position may characterize or indicate the difference between the shifting element and a further shifting element with which the shifting element is intended to and/or is able to intermesh.

Optionally, the constraint comprises an impact velocity at a constraint position. The constraint position may for example represent a neutral position, the commencement of engagement between the shifting element and the further shifting element and/or the end of a shifting operation. It has been found that it is possible to establish the impact velocity by defining the motion of the shifting element as a function of time, which makes it possible to strike a balance between shifting performance and noise production.

Optionally, a value of the impact velocity at the constraint position satisfies a threshold condition. The threshold condition may be defined by a velocity limit. Below the velocity limit, i.e. at an impact velocity with a value lower than the velocity limit, it is possible to reduce the emission of noise during shifting. In contrast, above the velocity limit, i.e. at an impact velocity with a value greater than the velocity limit, it is not possible to reduce the emission of noise during shifting. The motion profile may be determined by defining the constraint in such a way that the impact velocity satisfies the threshold condition.

Optionally, the constraint relates to a force characteristic of shifting the transmission. For example, the constraint may relate to an acceleration which can be defined by the force for meshing the shifting element with the further shifting element, divided by a characteristic mass. By specifying an acceleration as a constraint, this can be positively influenced in such a way that a threshold value is not exceeded. For this purpose, the threshold value of the acceleration specification is calculated from the desired force and the moving mass of the transmission or shifting mechanism in question.

Optionally, the motion profile has a polynomial relationship between the position of the shifting element and time. This makes it possible to define the motion profile in an effective manner. Optionally, the polynomial relationship has an order of three or more, for example five, in order to be able to define a jerk-free motion of the shifting element. The order of the polynomial relationship may be the order of a derivative of position as a function of time, resulting in a constraint corresponding to the order of the derivative of position as a function of time, i.e. velocity, acceleration and jerk.

Optionally, the motion profile has a variable velocity between the constraint positions defined by the constraint. This makes it possible to improve shifting performance and simultaneously to reduce the emission of noise. It has been found that a lower velocity may be used at the constraint positions than between the constraint positions in order to achieve relatively low-noise contact of the shifting element at the constraint positions and to be able to move the shifting element relatively rapidly between the constraint positions.

Optionally, the constraint defines a tooth-to-tooth position of the transmission. This makes it possible to control the motion of the shifting element in a potential tooth-to-tooth position so as to avoid the shifting element from becoming jammed in the tooth-to-tooth position.

Optionally, the constraint relates to a plurality of shifting elements, and the motion profile is determined for the plurality of shifting elements. In this way, the method described above may be used to activate more than one shifting element. In this case, the constraints of the motion transition may be obtained from shifting situations at two or more shifting elements.

Optionally, the constraint comprises impact velocities at a constraint position, and a value of each of the impact velocities at the constraint position satisfies a threshold condition. In other words, the constraint or the assignment of parameters of the motion transition may be selected based on the criteria of the impact velocity and/or impact noise of different shifting elements. The shifting elements involved in the respective motion transitions may comply with threshold values. This makes it possible to strike a balance between noise and the forces of the shifting actuators as a whole, i.e. the majority of the shifting elements.

According to a further aspect of the invention, a computer program and/or computer-readable medium is provided. The computer program and/or computer-readable medium comprises commands which, when the program or commands are executed by a computer, cause the computer to carry out the method described herein and/or the steps of the method described herein. The computer program and/or computer-readable medium may comprise commands to carry out steps of the method described as optional in order to achieve a corresponding technical effect.

According to a further aspect of the present disclosure, a control device for a vehicle, in particular a commercial vehicle, with an electrically shiftable transmission is provided. The control device may be configured to carry out steps of the method described as optional in order to achieve a corresponding technical effect.

According to a further aspect of the present disclosure, an electrically shiftable transmission is provided. The electrically shiftable transmission has a shifting element and the control device described above.

Optionally, the transmission has an electronically commutated synchronous motor for actuating the shifting element. For the purposes of actuation, the service life for example of a brushless motor of this type is considered advantageous.

According to a further aspect of the present disclosure, a vehicle, in particular a commercial vehicle, is provided. The vehicle has an electrically shiftable transmission and the control device described herein. The vehicle and/or the control device can be configured to carry out steps of the method described as optional and/or advantageous in order to achieve a corresponding technical effect.

BRIEF DESCRIPTION OF THE DRAWINGS

Further advantages and features of the invention and the technical effects thereof can be gathered from the figures and the description of the preferred embodiments shown in the figures, in which.

DETAILED DESCRIPTION

Figure 1:
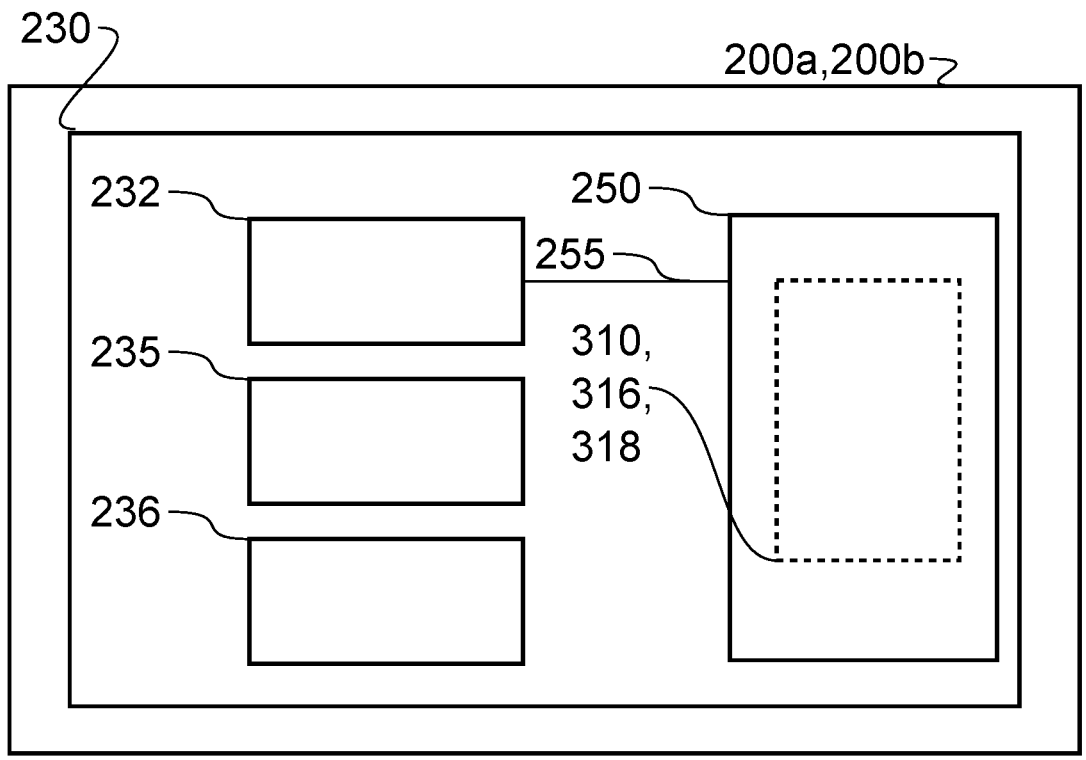
FIG. 1 shows a schematic representation of a vehicle, in particular a commercial vehicle, according to an embodiment of the invention.

FIG. 1 shows a schematic representation of a vehicle 200a, in particular a commercial vehicle 200b, according to an embodiment of the present disclosure. The vehicle 200a, in particular the commercial vehicle 200b, is referred to in the following as the vehicle 200a, 200b. The vehicle 200a, 200b is a land vehicle. The vehicle 200a, 200b is for example a lorry, bus, and/or a tractor unit of a multi-unit vehicle.

Figure 3:
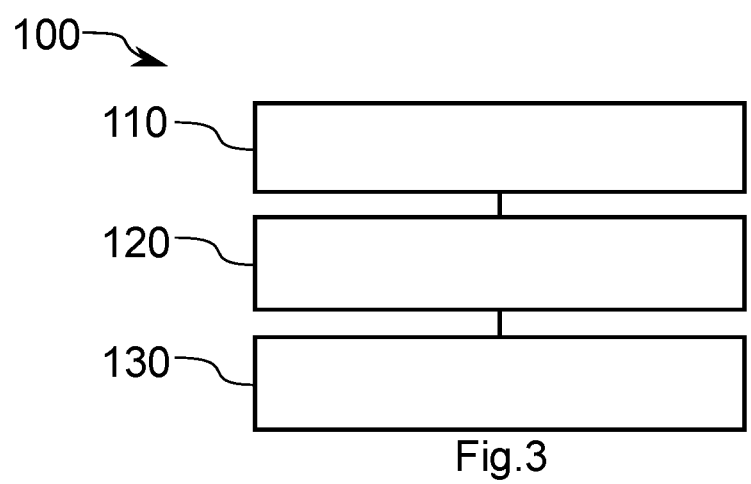
FIG. 3 shows a schematic representation of a sequence of a method according to an embodiment of the invention.

The vehicle 200a, 200b is configured to carry out the method 100 described in relation to FIG. 3. For this purpose, the vehicle 200a, 200b includes an electrically shiftable transmission 230. The electrically shiftable transmission 230 has a shifting element 235 and a further shifting element 236. A shifting operation is achieved, for example, by bringing the shifting element 235 out of a neutral position and into engagement with the further shifting element 236. This changes a distance between the shifting element 235 and the further shifting element 236. A variable which describes the distance between the shifting element 235 and the further shifting element 236 is referred to in the following as the position P.

In order to adjust and/or regulate the position P, the transmission 230 includes a control device 250, an adjustable electric shifting actuator (not shown), and an electronically commutated synchronous motor 232 or a brushless DC motor as a servomotor for actuating the shifting element 235. The control device 250 is configured to output a regulation signal 255 for regulating the position of the shifting element 235.

The control device 250 is further configured to carry out the method 100 described in relation to FIG. 3 in order to shift the electrically shiftable transmission 230. For this purpose, the control device 250 is configured to determine a motion profile 300 as described in relation to FIG. 2. For this purpose, the control device 250 ascertains the constraints 310, which are indicated schematically in FIG. 1 and relate to the shifting element 235 of the transmission 230. The constraints 310 define, for example, a position P at a time t and a velocity v, and/or an acceleration or force 316, which is to be attained by the shifting element 235 at the position P at the time t. A threshold condition 318 defined in the control device 250 may be taken into account.

The control device 250 may initially define a jerk-free motion profile 300 for intermeshing or engaging and/or disengaging a gear. For this purpose, the constraints 310 are defined and the motion profile 300 satisfying the constraints 310 is defined. In this process, the position P is provided as a function of time t and is altered in accordance with the motion profile 300. Any regulation algorithm may be used, for example a cascade for regulating the position, velocity, and/or a torque or force. In so doing, it is possible to utilize the fact that electrically actuatable actuators allow improved adjustability and control of the actuation process compared to pneumatic actuators.

In a further embodiment, the position P of the shifting element 235 and the further shifting element 236 can be adjusted and/or regulated. Accordingly, constraints 310 relating to a plurality of shifting elements 235, 236 are defined, and the motion profile 300 is determined for the plurality of shifting elements 235, 236. The constraints 310 each define, for example, a position P at a time t and a velocity v, and/or an acceleration or force 316 which is to be attained by the shifting element 235 or the further shifting element 236 at the position P at the time t. In this process, defined threshold conditions 318 may be taken into account in the control device 250 for the respective shifting element 235, 236 and/or the system of shifting elements 235, 236.

Figure 2:
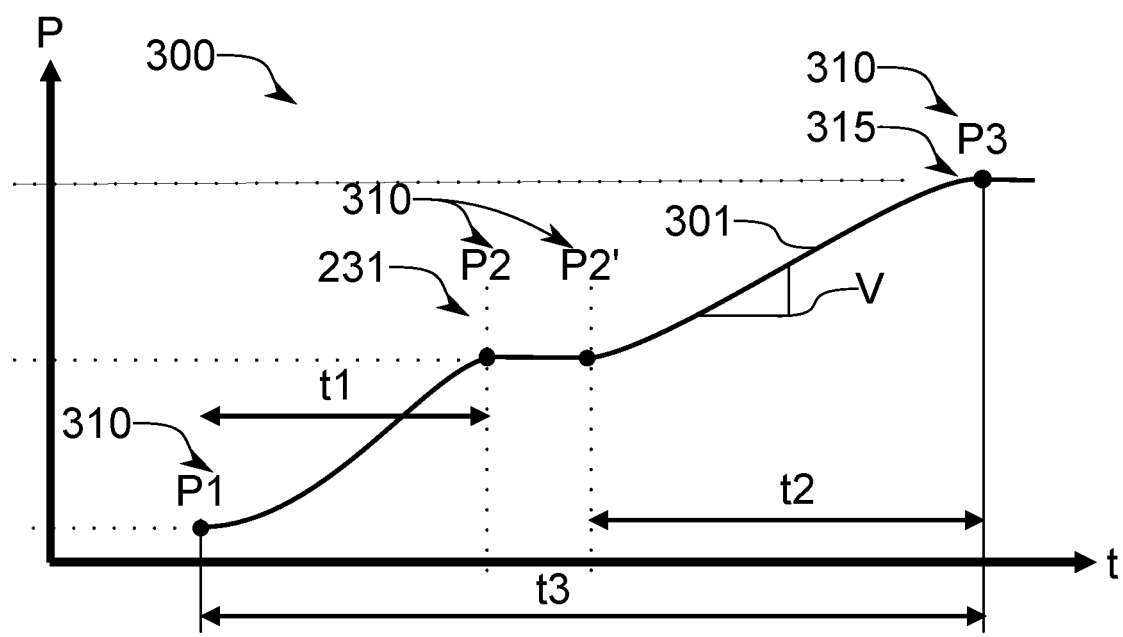
FIG. 2 shows a schematic representation of a motion profile for moving a shifting element of an electrically shiftable transmission according to an embodiment of the invention.

FIG. 2 shows a schematic representation of a motion profile 300 for moving a shifting element 235 of an electrically shiftable transmission 230 according to an embodiment of the present disclosure. A transmission 230 of this type is described in relation to FIG. 1. FIG. 2 is described with reference to FIG. 1 and the description thereof.

The motion profile 300 according to FIG. 2 defines a relationship of the position P as a function of time t, each shown on an arbitrary scale.

The motion profile 300 is defined in such a way that specific constraints 310 are fulfilled. The constraints 310 define constraint positions P1, P2, P2', P3. It is not necessary for the constraint positions P1, P2, P2', P3 to define extremal positions P, i.e. distances between the shifting element 235 and the further shifting element 236. For example, a first constraint position P1 may define a neutral position, a second constraint position P2, P2' may define a position P in which the teeth to be brought into engagement contact each other, and a third constraint position P3 may define a position P in which a shifting operation has been completed. The second position P2, P2' may therefore involve a tooth-to-tooth position 231. According to the motion profile 300, a time t elapses between arrival at the second position P2 and departure from the second position P2' in order to avoid the tooth-to-tooth position 231 and to reduce the risk of the shifting element 235 becoming jammed, considerable emission of noise, and/or considerable wear.

A first time t1 is defined between the first constraint position P1 being attained and the second constraint position P2 being attained. A second time t2 is defined between the second constraint position P2' being attained and the third constraint position P3 being attained.

A third time t3 is defined between the first constraint position P1 being attained and the third constraint position P3 being attained. The third time t3 characterizes the duration of the shifting operation. The third time t3 is gathered, inter alia, from the sum of the first time t1 and the second time t2. The first time t1 and the second time t2 are defined in such a way that the third time t3 is as brief as possible for a brief period of interruption to the force during the shifting operation, but long enough to compensate for noise and load. The parameters for the first time t1 and the second time t2 can optionally be assigned for this purpose by, for example, a manufacturer of the transmission 230 and/or the vehicle 200a, 200b.

The motion profile 300 has a polynomial relationship 301 between the position P of the shifting element 235 and time t. For example, the polynomial relationship 301 is a relationship between the position P and the time t of degree five. The polynomial relationship 301 can therefore be derived as a function of time to determine the velocity v and/or the acceleration of the motion and to define corresponding constraints 310. The motion profile 300 has a variable velocity v between the constraint positions P1, P2, P2', P3 defined by the constraint 310. The constraint 310 comprises an impact velocity 315 at a constraint position P1, P2, P2', P3. The value of the impact velocity 315 at the constraint positions P2 and P3 satisfies a threshold condition 318 and is in particular less than a velocity threshold value, for example asymptotically approaching zero. The constraint 310 at the third constraint position P3 relates to a force 316 characteristic of shifting the transmission 230, for example the force 316 required for meshing, divided by a characteristic mass.

The motion profile 300 may be jerk-free, i.e. the time derivative of acceleration is zero. For example, the constraints 310 may define that the acceleration at the first constraint position P1 and the second constraint position P2, P2' is zero and, at the third constraint position P3, it is equal to the characteristic force 316 divided by a characteristic mass.

In this way, the following advantages over a pneumatic regulation means are provided: no noise caused by the discharge of air, provision of controlled motion, the velocity v can be defined directly in the applicable constraint positions P1, P2, P2', P3, the velocity v is only defined and therefore limited at the constraint positions P1, P2, P2', P3, other velocities v can be used between the constraint positions P1, P2, P2', P3 in order to strike a balance between the emission of noise and shifting performance, mechanical loads on adjacent components of the transmission 230 are reduced, the shifting time can be shortened, and it is possible to reduce costs and weight by way of a corresponding construction by adapting stops, rigidity and/or fastenings.

FIG. 3 shows a schematic representation of a sequence of a method 100 according to an embodiment of the invention. The method 100 is a method 100 for shifting an electrically shiftable transmission 230 for a vehicle 200a, in particular a commercial vehicle 200b. A vehicle 200a, 200b of this type is described in relation to FIG. 1. A motion profile 300 for shifting an electrically shiftable transmission 230 is described in relation to FIG. 2. FIG. 3 is described with reference to FIGS. 1 and 2.

The method 100 according to FIG. 3 includes the steps of: ascertaining 110 a constraint 310 relating to a shifting element 235 of the transmission 230. The constraint 310 comprises an impact velocity 315 at a constraint position P1, P2, P2', P3. A value of the impact velocity 315 at the constraint position P2, P3 satisfies a threshold condition 318. The constraint 310 relates to a force 316 characteristic of shifting the transmission 230. The constraint 310 defines a tooth-to-tooth position 231 of the transmission 230.

A motion profile 300 for the shifting element 235 is determined 120, wherein the motion profile defines a position P of the shifting element 235 as a function of time t. The motion profile 300 has a polynomial relationship 301 between the position P of the shifting element 235 and time t. The motion profile 300 has a variable velocity v between the constraint positions P1, P2, P2', P3 defined by the constraint 310.

A regulation signal 255 for regulating the position of the shifting element 235 on the basis of the motion profile 300 is output 130. The signal is output 130 to an electronics unit for regulating a brushless DC motor as a servomotor.

REFERENCE SIGNS (PART OF THE DESCRIPTION)

100 method
110 ascertaining
120 determining
130 outputting
200a vehicle
200b commercial vehicle
230 electrically shiftable transmission
231 tooth-to-tooth position
232 synchronous motor
235 shifting element
236 further shifting element
250 control device
255 regulation signal
300 motion profile
301 polynomial relationship
310 constraint
315 impact velocity
316 force
318 threshold condition
P position
P1, P2, P2', P3 constraint position
t time
t1 first time
t2 second time
t3 third time
v velocity

The invention claimed is:

1. A method (100) for shifting an electrically shiftable transmission (230) for a vehicle (200a), wherein the method (100) comprises the steps of:
    ascertaining (110) a constraint (310) relating to a shifting element (235) of the transmission (230);
    determining (120) a motion profile (300) for the shifting element (235) on the basis of the constraint, wherein the motion profile (300) defines a position (P) of the shifting element (235) as a function of time (t); and
    outputting (130) a regulation signal (255) for regulating the position of the shifting element (235) on the basis of the motion profile (300);
    wherein the constraint (310) comprises an impact velocity (315) at a constraint position (P2, P3).

2. The method according to claim 1, wherein a value of the impact velocity (315) at the constraint position (P2, P3) satisfies a threshold condition (318).

3. The method according to claim 1, wherein the constraint (310) relates to a force (316) characteristic of shifting the transmission (230).

4. The method according to claim 1, wherein the motion profile (300) has a polynomial relationship (301) between the position (P) of the shifting element (235) and time (t).

5. The method according to claim 1, wherein the motion profile (300) has a variable velocity (v) between constraint positions (P1, P2, P2', P3) defined by the constraint (310).

6. The method according to claim 1, wherein the constraint (310) relates to a plurality of shifting elements (235, 236), and the motion profile (300) is determined for the plurality of shifting elements (235, 236).

7. A computer having a non-transitory computer-readable medium having instructions stored thereon, the instructions comprising commands which, when executed by a processor, cause the computer to carry out the method (100) according to claim 1.

8. A control device (250) configured to carry out the method according to claim 1 for the vehicle (200a) with the electrically shiftable transmission (230).

9. The electrically shiftable transmission (230) with the shifting element (235) and the control device (250) according to claim 8, wherein the transmission includes a motor for actuating the shifting element.

10. The electrically shiftable transmission (230) according to claim 9, wherein the motor of the transmission (230) is an electronically commutated synchronous motor (232) for actuating the shifting element (235).

11. The vehicle (200a) with the electrically shiftable transmission (230) according to claim 9, wherein the vehicle is a commercial vehicle.

12. A method (100) for shifting an electrically shiftable transmission (230) for a vehicle (200a), wherein the method (100) comprises the steps of:
    ascertaining (110) a constraint (310) relating to a shifting element (235) of the transmission (230);
    determining (120) a motion profile (300) for the shifting element (235) on the basis of the constraint, wherein the motion profile (300) defines a position (P) of the shifting element (235) as a function of time (t); and
    outputting (130) a regulation signal (255) for regulating the position of the shifting element (235) on the basis of the motion profile (300);
    wherein the constraint (310) defines a tooth-to-tooth position (231) of the transmission (230).

13. The method according to claim 12, wherein the constraint (310) relates to a plurality of shifting elements (235, 236), and the motion profile (300) is determined for the plurality of shifting elements (235, 236).

14. The method according to claim 12, wherein the constraint (310) relates to a force (316) characteristic of shifting the transmission (230).

15. The method according to claim 12, wherein the motion profile (300) has a polynomial relationship (301) between the position (P) of the shifting element (235) and time (t).

16. The method according to claim 12, wherein the motion profile (300) has a variable velocity (v) between constraint positions (P1, P2, P2', P3) defined by the constraint (310).

17. A computer having a non-transitory computer-readable medium having instructions stored thereon, the instructions comprising commands which, when executed by a processor, cause the computer to carry out the method (100) according to claim 12.

18. A control device (250) configured to carry out the method according to claim 12 for the vehicle (200*a*) with the electrically shiftable transmission (230).

19. The electrically shiftable transmission (230) with the shifting element and the control device (250) according to claim 18, wherein the transmission (230) has an electronically commutated synchronous motor (232) for actuating the shifting element (235).

20. A method (100) for shifting an electrically shiftable transmission (230) for a vehicle (200*a*), wherein the method (100) comprises the steps of:

ascertaining (110) a constraint (310) relating to a shifting element (235) of the transmission (230);

determining (120) a motion profile (300) for the shifting element (235) on the basis of the constraint, wherein the motion profile (300) defines a position (P) of the shifting element (235) as a function of time (t); and outputting (130) a regulation signal (255) for regulating the position of the shifting element (235) on the basis of the motion profile (300);

wherein the constraint (310) relates to a plurality of shifting elements (235, 236), and the motion profile (300) is determined for the plurality of shifting elements (235, 236);

wherein the constraint (310) comprises impact velocities (315) at a constraint position (P2, P3), and a value of each of the impact velocities (315) at the constraint position (P2, P3) satisfies a threshold condition (318).

\* \* \* \* \*